Sept. 28, 1965   D. M. CHAPMAN, JR   3,209,128
HEATING MAT
Filed Nov. 20, 1962   2 Sheets-Sheet 1
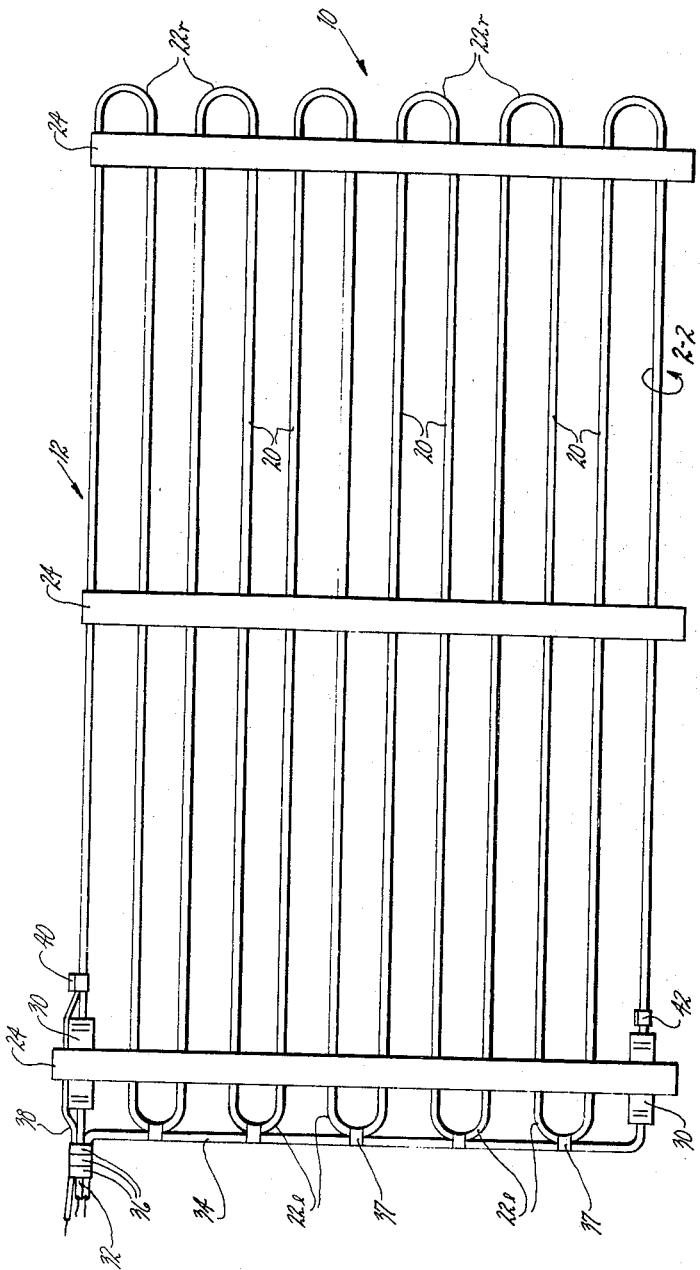
INVENTOR.
DONALD M. CHAPMAN JR.
BY
ATTORNEYS Sept. 28, 1965  D. M. CHAPMAN, JR  3,209,128
HEATING MAT Filed Nov. 20, 1962  2 Sheets-Sheet 2

United States Patent Office 3,209,128
Patented Sept. 28, 1965

3,209,128
HEATING MAT
Donald M. Chapman, Jr., Plainville, Conn., assignor to The Smith-Gates Corporation, Farmington, Conn., a corporation of Connecticut
Filed Nov. 20, 1962, Ser. No. 238,927
2 Claims. (Cl. 219—528)

This invention relates to an electrically operable heating mat which can be embedded in paving materials such as concrete and asphalt and operated to heat the material and thereby to melt snow, ice, etc.

It is the general object of the invention to provide a heating mat of the type mentioned which exhibits a high degree of flexibility throughout and which is substantially immune to chafing wear as might expose the core of a heating element and result in a short circuit.

The drawings show two preferred embodiments of the invention and such embodiments will be described, but it will be understood that various changes may be made from the construction disclosed, and that the drawings and description are not to be construed as limiting the scope of the invention, the claims forming a part of this specification being relied upon for the purpose.

Of the drawings:

FIG. 1 is a plan view of a heating mat forming a first embodiment of the present invention.

FIG. 2 is an enlarged fragmentary view showing a portion of a heating element included in the mat of FIG. 1.

Figure 3:
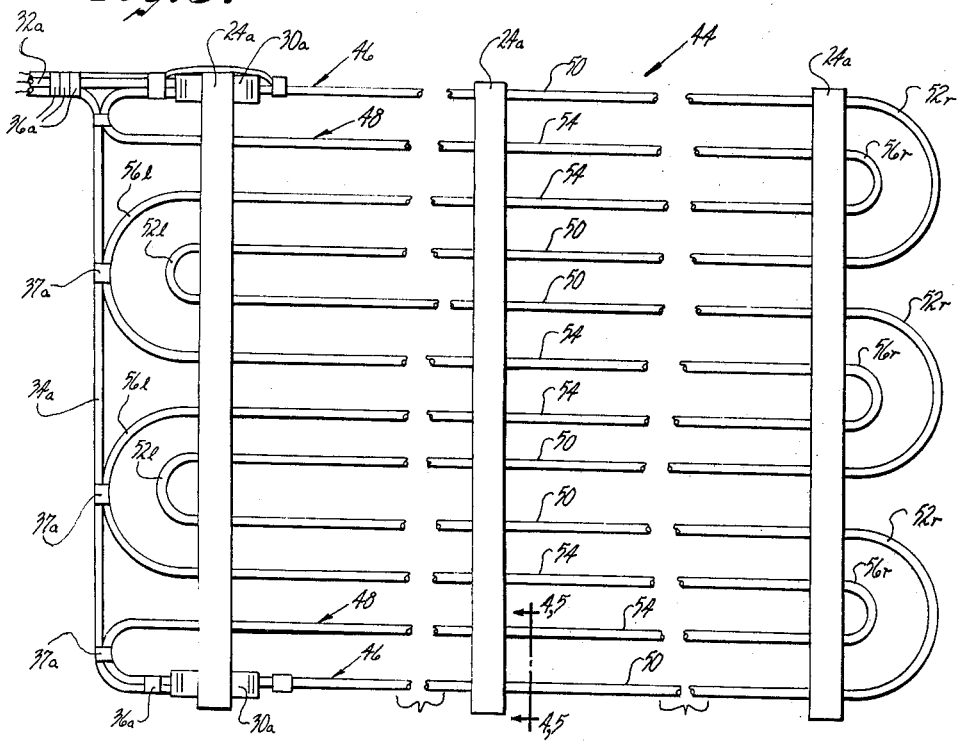
FIG. 3 is a plan view of a heating mat constituting a second embodiment of the present invention.

Referring now particularly to FIG. 1, it will be observed that a heating mat 10 shown therein comprises an elongated flexible heating element indicated generally at 12. As best shown in FIG. 2, the heating element 12 includes an electrically conductive high resistance core 14 and an insulating sheath. The insulating sheath is shown as comprising inner and outer parts 16 and 18 but various other forms of insulating sheaths may be employed. The sheath is flexible, as is the core 14, but is yet durable with a high degree of resistance to chafing wear. Various plastic materials may be employed in forming the insulating sheath.

Referring again to FIG. 1, it will be noted that the heating element 12 includes a plurality of spaced relatively long similar portions 20, 20. Twelve (12) portions 20 are shown but the number of such portions is optional. The portions 20, 20 are arranged in the heating mat in transversely spaced parallel and longitudinally extending relationship.

Interconnecting the longitudinally extending portions 20, 20 of the heating element 12 are short portions of said element designated 22l at the left hand end of the mat and short portions 22r, 22r at the right hand portion of the mat. Each of the portions 22l, 22l, and 22r, 22r extends generally transversely and, as shown, take a generally semi-circular configuration. Five connecting portions 22l, 22l are shown together with six connecting portions 22r, 22r, both ends of the heating element 12 being disposed at the left hand end of the mat 10.

In accordance with the invention, the heating mat includes at least two transversely extending spacer members and three such members are shown at 24, 24 in the heating mat 10 of FIG. 1. Further in accord with the invention, each of the spacer members 24, 24 comprises at least one thin flat flexible tape substantially wider than the heating element 12. As shown, the spacer members 24, 24 each comprise a pair of similar thin flat flexible tapes 26, 28 disposed in face-to-face relationship with adhesive bearing surfaces thereof in engagement with each other, FIG. 4. As will be observed, the spacer members 24, 24 are disposed in longitudinally spaced relationship with short sections of the heating element portions 20, 20 disposed between the tapes 26 and 28 so as to be secured in position thereby.

From the foregoing it will be apparent that the heating mat 10 can be conveniently rolled for transport and disposed in the flat position shown so as to be embedded in concrete or asphalt or the like. The flexibility of the tapes 26, 28 of the spacer members 24, 24 is preferably substantially greater than that of the heating element 12 and it may be said that the material of the tapes is somewhat softer than that of the insulating sheath 16, 18 of said element. The tape material may vary widely but a plastic-coated fabric is presently preferred. Thus, shifting forces applied to the heating mat through concrete or asphalt are ineffective to cause chafing wear of the insulating sheath 16, 18 and to bare the core 14 of the heating element 12 whereby to cause a short circuit condition. This characteristic of the heating mat renders it particularly well suited to use in asphalt where the transmittal of shifting forces is substantial due to the comparative softness of the material.

Still referring to FIG. 1, it will be observed that connectors 30, 30 are provided at the end of the heating element 12. Said connectors may comprise any suitably water-tight elements for effecting electrical connections between the ends of said heating element and first and second cold lead wires 32, 34. Preferably, and as shown, the connectors 30, 30 are disposed so as to be enveloped and secured in position by the tapes 26, 28 of the lefthand spacer member 24.

The lead wires 32, 34 may be held together with a ground lead 38 by means of suitable bands 36, 36, three shown. The said bands are adapted to be moved along the lead wires to spaced positions as the lead wires are unrolled from stored positions. Bands 37, 37 may be utilized as shown to connect the lead wire 34 to the connecting portions 22l, 22l of the heating element 12.

The heating mat 10 is preferably also provided with a ground wire secured to the lead 38 adjacent the connector 30. Said ground wire may vary substantially in form but preferably comprises at least one element wound about and secured on the heating element 12 and extending substantially throughout the length of said element. As shown in FIG. 2, a plurality of ground wires 39, 39 are provided and are disposed in spaced interwoven relationship on and about the heating element 12. Said ground wires are connected with the ground lead 38 at a small band 40 and are held in position on the heating element 12 at the opposite end of said element by a second band 42.

In FIG. 3 there is shown a heating mat 44 constituting a second embodiment of the present invention and which includes first and second elements indicated generally at 46 and 48. Each of the heating elements 46 and 48 may be substantially identical with the aforedescribed heating element 12 and each of said elements is connected at one end to a connector 30a at the upper lefthand portion of the heating mat. A second connector 30a at the lower left hand portion of the heating mat connects the elements 46, 48 to a cold lead 34a and a cold lead 32a extends to the aforementioned connector 30a. Small bands 36a, 37a correspond to the bands 36, 37 in the heating mat 10.

Spacer members 24a, 24a of the heating mat 44 are similar in construction and function to the members 24, 24 in the heating mat 10.

Still referring to FIG. 3, it will be observed that the heating element 46 has relatively long transversely spaced, parallel, and longitudinally extending portions 50, 50. Relatively short connecting portions 52r, 52r at the right-hand end of the heating mat 42 interconnect the portions 50, 50 and extend generally transversely with generally semicircular configurations. However, it will be observed that the portions 52r, 52r are substantially longer and struck on a substantially larger radius than the aforementioned connecting portions 22r, 22r in the heating mat 10. Left hand connecting portions 52l, 52l connect adjacent portions 50, 50 and are substantially identical with the aforementioned connecting portions 22l, 22l.

The heating element 48 has longitudinally extending portions 54, 54 similar to the portions 50, 50 of the element 46. Short connecting portions 56r, 56r of the heating element 48, disposed at the right hand portion of the mat 44, are substantially identical with the aforementioned portions 22r of the heating mat 10. At the left hand portion of the mat 44, short connecting portions 56l, 56l correspond to the aforementioned portions 52r, 52r of the heating element 46.

From the foregoing it will be apparent that the heating elements 46, 48 of the heating mat 44 have longitudinally and transversely extending portions of different lengths so as to be interwoven in a single thickness mat with the heating elements in substantially equally spaced relationship throughout their lengths. Thus, an even distribution of heat is provided for in an arrangement which is particularly well suited to convenient manufacture of comparatively long heating mats.

Figure 4:
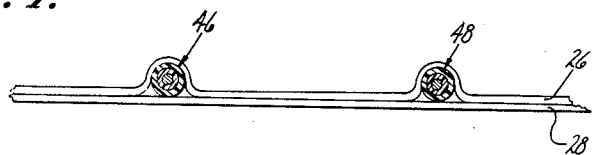
FIG. 4 is an enlarged fragmentary section taken generally as indicated at 4—4 in FIG. 3.
Figure 5:
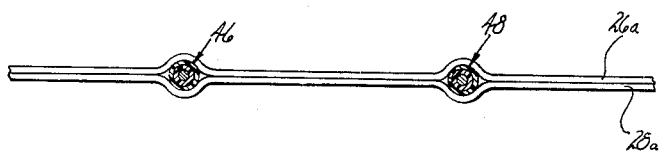
FIG. 5 is a section similar to FIG. 4 but showing an alternative construction of heating elements and spacer members.

Referring now particularly to FIGS. 4 and 5, it will be observed that the lower tape 28 in FIG. 4 is maintained in a substantially flat condition in the assembled heating mat. The upper tape 26 is bent upwardly to envelope each of the heating elements 46, 48. In FIG. 5 the longitudinal axes of the heating elements 46, 48 lie substantially in the central plane between the tapes 26a and 28a with each of the tapes bent equally to envelope the elements. While one or the other of the FIG. 4 and FIG. 5 forms may be preferred for ease of manufacture, each of said constructions provides for substantial immunity to chafing wear and short circuiting as mentioned above.

The invention claimed is:

1. The combination in an electrically operable heating mat of at least one elongated flexible heating element comprising a core and an insulating sheath, said element being arranged with a plurality of similar generally rectilinear portions thereof in transversely spaced parallel and longitudinally extending relationship, connecting portions of said element between and at the ends of said first mentioned portions being generally semicircular in configuration and generally transverse in extent, a plurality of flexible ground wires interwoven on and about said heating element, at least two transversely extending spacer members each comprising first and second thin flat flexible adhesive bearing tapes substantially wider than said heating element, said spacer members being arranged in longitudinally spaced relationship with their tapes enveloping and adhesively engaging sections of said first mentioned portions of said heating element, a pair of insulated connectors secured respectively to end portions of said heating element and held between said first and second tapes of said spacer members, and a pair of cold lead wires secured respectively to said connectors.

2. The combination in an electrically operable heating mat as set forth in claim 1 wherein there is provided a second heating element secured at opposite ends to said connectors and arranged in a manner similar to said first mentioned heating element, said two elements however having connecting portions of different lengths so as to be interwoven in a single thickness mat in substantially equally spaced relationship throughout their lengths.

References Cited by the Examiner

UNITED STATES PATENTS

| Re. 22,763 | 6/46 | Clark | 5—347 |
| 303,735 | 8/84 | Jackson | 174—117.6 X |
| 2,182,968 | 12/39 | Lunsford | 174—117.4 X |
| 2,529,914 | 11/50 | Challenner | 219—528 X |
| 2,924,141 | 2/60 | Kinniburgh | 174—102 X |
| 2,943,289 | 6/60 | Colten et al. | 219—523 |
| 2,997,568 | 8/61 | Leopold et al. | 219—213 |
| 3,005,895 | 10/61 | Jamison | 219—345 |
| 3,010,007 | 11/61 | Theodore et al. | 219—345 |
| 3,056,011 | 9/62 | Deacon | 219—345 |

FOREIGN PATENTS

| 920,487 | 1/47 | France. |
| 393,304 | 6/33 | Great Britain. |
| 884,296 | 12/61 | Great Britain. |

RICHARD M. WOOD, *Primary Examiner.*